United States Patent Office 2,741,422
Patented Apr. 10, 1956

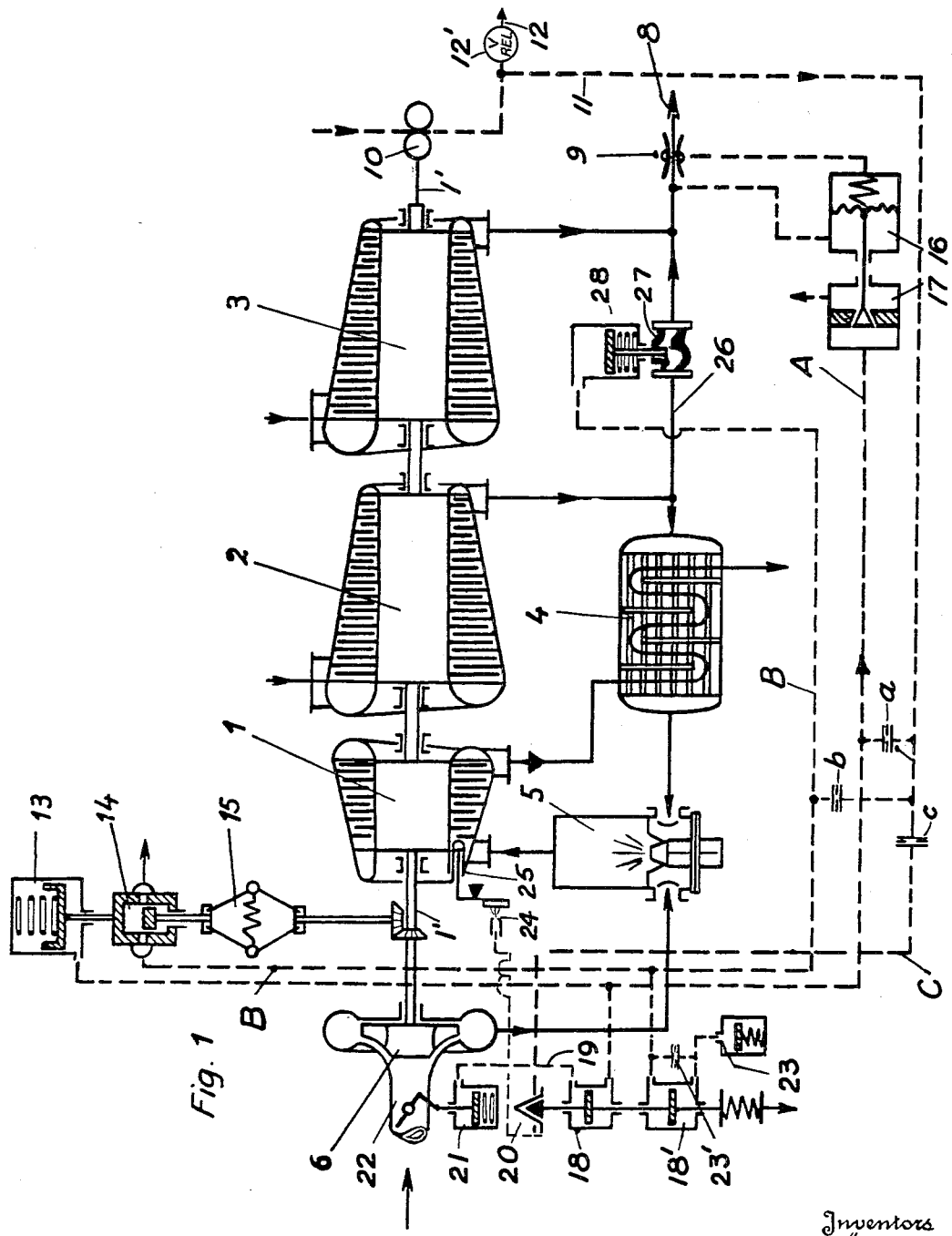

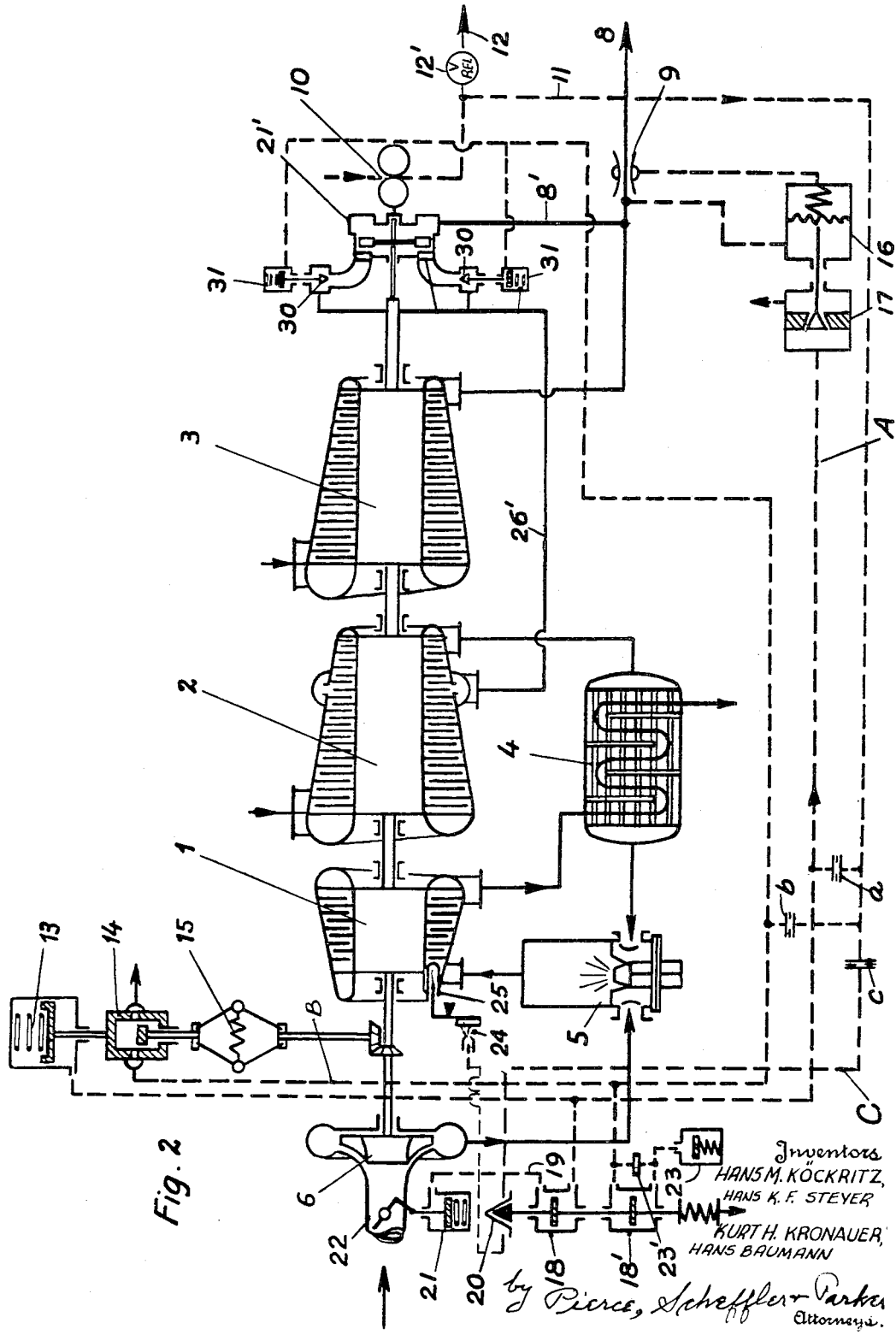

2,741,422

GAS TURBINE PLANT

Hans M. Köckritz, Weinheim an der Bergstrasse, Hans K. F. Steyer, Heidelberg, and Kurt H. Kronauer, Laudenbach an der Bergstrasse, Germany, and Hans Baumann, Baden, Switzerland, assignors to Brown, Boveri & Cie, Aktiengesellschaft, Mannheim, Germany Application September 30, 1954, Serial No. 459,262

Claims priority, application Germany October 9, 1953

4 Claims. (Cl. 230—4)

This invention relates to a gas turbine plant for the production of compressed air in addition to that quantity which is required for the motive fluid for the gas turbine.

It is known to employ a constant pressure combustion gas turbine to drive a single compressor which supplies the combustion air for the turbine operation and also delivers compressed air to an external load such as, for example, a blast furnace. It is also known to have a combustion gas turbine drive a compressor for supplying its combustion air and a second compressor for delivering air to an external load. For convenience of description, the second compressor which has an effective output other than to the turbine plant itself will be designated hereinafter as an "effective" air compressor. In some installations of the latter type, it has been proposed to connect the outputs of the two compressors in parallel in such manner that, for regulation, air from the turbine compressor may be delivered to the load or, alternatively, air from the effective compressor may be delivered to the combustion chamber of the turbine plant. According to another plan, the connecting line between the compressors has been arranged between points of such relative pressures that air can be transferred only from the effective air compressor to the turbine circuit and not from the turbine compressor to the load.

If, in these known turbine-compressor plants, the only work output of the gas turbine is in the form of effective air delivered to a load with no electric machine present which can deliver power to or take up power from the system, the following disadvantageous performance results: For a correct design of the plant for normal operation, the work output of the gas turbine is just sufficient to cover the power requirement of the effective air compressor and, for best thermal efficiency, the gas turbine operates at the highest permissible temperature. But if the air inlet temperature increases, or if the efficiency of the machines decreases, the equilibrium of the group can be maintained only by increasing the temperature of the gas turbine. This was not possible, however, if the turbine was already operating at the highest permissible temperature, and it has been necessary to reduce the speed of the plant and hence its output. It has therefore been necessary to design the prior plants for normal operation at less than optimum turbine temperatures, and consequently less than maximum efficiency, to permit a temperature rise when necessary to maintain a full output.

Objects of the invention are to provide gas turbine plants for the production of compressed air, the plants including an air compressor for supplying combustion air and a separate effective air compressor for delivering air to a load, and regulating mechanism for operation at maximum efficiency of the turbine components at all times and without danger of excessive turbine temperatures. An object is to provide a gas turbine plant including a compressor for supplying combustion air for the turbine operation and a second compressor for delivering compressed air to an external load, and regulating mechanism for controlling the volume of combustion air to maintain operation at high efficiency without danger of excessive temperatures in the turbine. More specifically, an object is to provide a turbine plant of the type stated in which the compressor outputs are connected by a line which includes a controlled device for regulating the quantity of combustion air in accordance with the power requirements of the turbine plant to maintain the desired output of effective air to an external load.

These and other objects and the advantages of the invention will be apparent from the following specification when taken with the accompanying drawings, in which:

Fig. 1 is a schematic view of a turbine plant embodying the invention, the controlled device in the line connecting the compressors being a throttle valve; and Fig. 2 is a schematic view of a modification in which the controlled device is an air turbine of variable power absorption.

In Fig. 1, the reference numeral 1 identifies a turbine element on and driving a common shaft 1' on which the rotors of a combustion air compressor 2 and effective air compressor 3 are mounted. The turbine 1 exhausts through a heat exchanger 4 through which combustion air flows to a combustion chamber 5 which receives the fuel, which is assumed to be gaseous, from a blower 6 which also is mounted on shaft 1'.

The output from the effective air compressor 3 is delivered to a load, not shown, through a conduit 8 provided with a gauge 9, shown schematically as a Venturi tube, for measuring the particular factor, volume or pressure, which should be maintained constant at any given plant. The gauge 9 controls the turbine regulating system which may be of known electrical, mechanical or pneumatic type but is here shown for purpose of illustration as of the hydraulic or oil under pressure type.

An oil pump 10 on shaft 1' delivers oil to a line 11 which is maintained under constant pressure by the discharge of excess oil to line 12, which leads to the lubricating system of the plant and to a sump, through a relief valve 12'. Three control lines A, B and C are fed from the oil pressure line 11 through measuring orifices, a, b and c, respectively. Control line A extends to a servomotor 13 which actuates the sleeve 14 of a control element in line B which includes a piston movable by the centrifugal speed governor 15. The effective pressure in control line A is determined by the measuring device 9 through a regulator 16 which controls a leak 17 in the line. One end of the cylinder of a servomotor 18 is also connected to control line A, and the other cylinder end is connected through a line 19 to a variable leak 20 and to a servomotor 21 which adjusts a throttle 22 in the inlet to the fuel gas blower 6. The piston of servomotor 18 is connected to that of a second servomotor 18' having a cylinder with one end connected to control line B and its opposite end connected to a buffer space 23, the opposite ends of the cylinder being connected by a calibrated orifice 23'.

The control line C is connected to line 19 between the servomotors 18 and 21, and it is provided with a leak 24 which is adjusted by a thermally responsive member 25 mounted in the intake of turbine 1, the leak 24 being in series with the leak 20 which is adjustable by servomotors 18 and 18'. The function of this thermostatic control system is to prevent further opening of the gas throttle valve 22 when the temperature at the turbine inlet is already at the maximum permissible value.

The output side of the turbine air compressor 2 is connected to the output of the effective air compressor 3 and the load line 8 by a conduit 26 provided with a throttle valve 27 actuated by a servomotor 28 fed from control line B. As will be explained later, pressure air flows through conduit 26 in only one direction in accordance with the particular design of each installation.

Assuming that the plant is designed for some air from turbine compressor 2 to flow through conduit 26 to the load under normal operating conditions, a decrease in the volume or pressure of the effective air, as measured by device 9, will result in a decrease in the oil pressure in control line A and the piston in servomotor 18 will drop down, thus tending to open the leak 20 to open the fuel valve 22. This would increase the temperature of the combustion gases, thus accelerating the turbine and increasing the effective air output. However, if the turbine were already operating at maximum efficiency with the maximum permissible inlet temperature, further opening of the throttle 22 is blocked by the thermostatic control elements 24, 25 of control line C and the desired regulation is effected through the transmission of the control impulse of line A to the servomotor 13 which shifts the sleeve 14 to decrease the pressure in control line B and actuate servomotor 28 to close or partially close throttle valve 27 in conduit 26, thus decreasing the amount of air supplied by turbine blower to the load line 8 and increasing the quantity which it delivers to the combustion chamber 5. The volume of the combustion gases is thereby increased to accelerate the turbine, but the turbine inlet temperature does not rise above the critical value which affords high efficiency without danger of over-heating.

If the plant were designed for the effective air compressor 3 to develop a higher pressure than the turbine air compressor 2, the regulation would be varied in such manner that a demand for additional effective air would result in an opening of the throttle valve in the connecting conduit 26 to divert some effective air to the combustion chamber 5, thereby increasing the volume of combustion gases to accelerate the turbine and increase the effective air output. In all cases, the turbine operates at high efficiency under all loads as the thermostatic elements of control line B cooperate in the adjustment of fuel valve 22 to that position which develops, but does not exceed, the maximum permissible inlet temperature at the turbine.

The plant illustrated in Fig. 2 includes many elements which may be substantially identical with the Fig. 1 plant and these are identified by like reference numerals but will not be described in detail. The plant differs from that previously described in that the control element in the conduit 26' which connects the outputs of the turbine air compressor 2 and the effective air compressor 3 is an expansion air turbine 21' of regulable absorption capacity having inlet valves 30 actuated by servomotors 31 actuated by pressure oil in control line B. The air turbine 21' is mounted on the common shaft 1' and it exhausts through line 8' into the effective air line 8.

As in the Fig. 1 plant, the regulation exerted by the measuring device 9 controls the quantity of air delivered to the combustion chamber 5 to develop sufficient power, without excessive heating of the turbine, to maintain the desired output of effective air. As shown, the conduit 26' is connected to an intermediate stage of the turbine air compressor 2 as the particular plant illustrated is assumed to deliver effective air at a pressure substantially lower than the maximum pressure developed by the turbine air compressor 2. The same arrangement and method of control would be employed if the connecting conduit 26' were coupled to the output of compressor 2, i. e. the turbine air compressor 2 is designed to deliver substantially more air than is normally required for combustion, and so much of its output as is not required for turbine operation at the maximum permissible temperature is delivered to the effective air line through the expansion turbine. The losses in regulation of a turbine plant as shown in Fig. 2 are somewhat less than those of Fig. 1, but even the throttling losses introduced by a throttle valve 27 are comparatively small since only a relatively small quantity of the total compressed air flows through the conduit 26.

We claim:

1. A gas turbine plant for the production of compressed air comprising a combustion gas turbine having an inlet and an outlet, a combustion chamber connected to the inlet of said turbine to supply combustion gas thereto to drive said turbine, means for supplying fuel to said combustion chamber, a compressor driven by said turbine and connected to supply air to said combustion chamber, an effective air compressor driven by said turbine for supplying compressed air to a load, said turbine and compressors having a common shaft, a conduit connecting the outputs of said compressors, control means in said conduit for determining the volume of air delivered to said combustion chamber, and turbine regulating means including means to actuate said control means and means to limit the maximum temperature at the inlet to said turbine.

2. A gas turbine plant as recited in claim 1, wherein said first compressor develops a higher output pressure than said effective air compressor, whereby pressure air normally flows in said conduit from said first compressor to the load, said control means comprises a throttle valve, and said turbine regulating means actuates said throttle valve on an increasing demand for effective air by the load to decrease the supply of air from said first compressor to the load, thereby to increase the quantity of air delivered to said combustion chamber.

3. A gas turbine plant as recited in claim 1, wherein said effective air compressor develops a higher output pressure than said first air compressor, said control means comprises a throttle valve, and said turbine regulating means actuates said throttle valve on an increasing demand for effective air by the load to open said throttle valve, thereby to deliver air from said effective air compressor to said combustion chamber.

4. A gas turbine plant for the production of compressed air comprising a combustion gas turbine having an inlet and an outlet, a combustion chamber connected to the inlet of said turbine to supply combustion gas thereto to drive said turbine, means for supplying fuel to said combustion chamber, a compressor driven by said turbine and connected to supply air to said combustion chamber, an effective air compressor driven by said turbine for supplying compressed air to a load, said turbine and compressors having a common shaft, a conduit connecting the outputs of said compressors, control means in said conduit for determining the volume of air delivered to said combustion chamber comprising an expansion air turbine on said common shaft, said expansion air turbine having an inlet connected to the first compressor end of said conduit and an exhaust connected to the effective air compressor end thereof, adjustable valves in said air turbine inlet, and turbine regulating means including means to control said adjustable inlet valves and means to limit the maximum temperature at the inlet of said turbine.

References Cited in the file of this patent
UNITED STATES PATENTS

| | | |
|---|---|---|
| 1,265,444 | Good | May 7, 1918 |
| 2,404,748 | Salzmann | July 23, 1946 |